(12) United States Patent
Izutani

(10) Patent No.: US 7,761,539 B2
(45) Date of Patent: Jul. 20, 2010

(54) COMPUTER SYSTEM AND METHOD THEREOF

(75) Inventor: Kenji Izutani, Tokyo (JP)

(73) Assignee: Hewlett-Packard Development Company, L.P., Houston, TX (US)

(*) Notice: Subject to any disclaimer, the term of this patent is extended or adjusted under 35 U.S.C. 154(b) by 785 days.

(21) Appl. No.: 11/576,045

(22) PCT Filed: Sep. 27, 2004

(86) PCT No.: PCT/JP2004/014067

§ 371 (c)(1),
(2), (4) Date: Mar. 26, 2007

(87) PCT Pub. No.: WO2006/035478

PCT Pub. Date: Apr. 6, 2006

(65) Prior Publication Data

US 2008/0059615 A1  Mar. 6, 2008

(51) Int. Cl.
G06F 15/177 (2006.01)
(52) U.S. Cl. ............... 709/222; 709/220; 709/221; 709/228; 726/3
(58) Field of Classification Search ........... 709/220, 709/221, 222, 227, 228; 726/3
See application file for complete search history.

(56) References Cited

U.S. PATENT DOCUMENTS 5,812,819 A * 9/1998 Rodwin et al. ............. 703/23
6,982,953 B1 * 1/2006 Swales ...................... 370/218
7,318,101 B2 * 1/2008 Droms ....................... 709/229

FOREIGN PATENT DOCUMENTS

| JP | 2001-326696 A | 11/2001 |
| JP | 2003-234755 A | 8/2003 |
| JP | 2003-273889 A | 9/2003 |
| JP | 2004-64379 A | 2/2004 |
| JP | 2004-228799 A | 8/2004 |

* cited by examiner

Primary Examiner—Yves Dalencourt

(57) ABSTRACT

A computer system to which measures against computer virus can be taken with ease, and a method therefor. In a computer network system, a first GW server is assigned an IP address to which a netmask of 24 bits (allowing to perform communication with 256 other nodes at the maximum) is imparted, and is allowed to perform communication with all of client computers. Upon occurrence of an abnormal condition such as viral infection, the client computers are assigned or reassigned IP addresses including a netmask (for example, 30 bits; allowing to perform communication with two other nodes at the maximum) that only allow to perform communication with a security measure server via a second GW server, whereby the client computers are allowed to perform communication only with the security measure server via the second GW server. In this way, the security measures are taken.

11 Claims, 14 Drawing Sheets

COMPUTER NETWORK SYSTEM
(DURING SECURITY MEASURE COMMUNICATION)

COMPUTER NETWORK SYSTEM
(DURING NORMAL COMMUNICATION)
1

COMPUTER NETWORK SYSTEM
(DURING COMMUNICATION BETWEEN SECOND GW AND CLIENT)

COMPUTER NETWORK SYSTEM
(DURING SECURITY MEASURE COMMUNICATION)

DURING NORMAL COMMUNICATION (S12)

COMPUTER SYSTEM AND METHOD THEREOF

RELATED APPLICATIONS

The present application is a National Phase entry of International Application Number PCT/JP2004/014067, filed Sep. 27, 2004, which is incorporated by reference herein in its entirety.

TECHNICAL FIELD

The present invention relates to a computer system including a computer that performs communication using an IP address with a netmask, and to a method thereof.

BACKGROUND ART

At present, as a protocol for communication among computers (in the following description, computers and the like that perform communication/information processing may be generally referred to as "nodes"), the transmission control protocol/internet protocol (TCP/IP) is generally used. For communication using the TCP/IP, an IP address of a 32-bit configuration is assigned to each of the nodes.

This IP address includes a network section used for identifying a network to which each of the nodes belongs and a host section used for identifying each of the nodes in the network to which the node belongs.

The network section and the host section of the IP address are identified by a netmask of a 32-bit configuration. Each of the bits of the netmask is 1 when a bit of the IP address corresponding thereto is included in the network section and is 0 when the bit of the IP address is included in the host section (the number of bits being 1 is hereinafter referred to as the number of bits of the netmask).

As a protocol for managing the IP address and assigning the IP address to each of the nodes, the dynamic host configuration protocol (DHCP) is generally used.

Further, in recent years, there is a serious problem that programs (data) spread from computer to computer via a network and adversely effects on the computers in various ways to lead leakage of data from the computers and the like. Such programs (data) are also called computer viruses or worms.

A computer virus/worm is formed of a program code, a macro of a specific application program, and data for execution of the code and the macro, or a combination including one or more of the above. Hereinafter, the computer virus/worm is generally referred to as a computer virus or as a virus simply.

For example, Patent Document 1 discloses a method of preventing an illegal access to a DHCP server that provides a DHCP function in a network in which the IP address and the DHCP are used.

However, the method disclosed in Patent Document 1 cannot prevent an infection of a virus from spreading among computers connected to a network.

Patent Document 1: JP 2004-228799 A

DISCLOSURE OF THE INVENTION

Problems to be Solved by the Invention

The present invention has been made in view of the background described above, and it is an object of the present invention to provide a computer system, which is improved so IP addresses can be used more flexibly in a network by contriving a method of using netmasks, and a method thereof.

It is another object of the present invention to provide a computer system, which is improved so that computers connected to a network can be provided with various functions by contriving netmasks and a method of assigning IP addresses with the netmasks, and a method thereof.

It is still another object of the present invention to provide a computer system capable of easily taking measures against computer viruses, and a method thereof.

Means for Solving the Problems

To attain the above-mentioned objects, a computer system according to the present invention relates to a computer system, in which communication is performed using a first IP address with a first netmask having a predetermined number of bits and a second IP address with a second netmask having a number of bits different from that of the first netmask. The computer system includes: one or more first nodes for performing communication using the first IP address or the second IP address; one or more second nodes for performing communication using the second IP address; and a third node for selectively assigning the first IP address or the second IP address to the first nodes.

Preferably, the first nodes are network computers for performing communication in a network to which the first netmask and the second netmask are applied, the second nodes are first gateway servers for performing communication control among the network computers, and the third node is a DHCP server for selectively assigning the first IP address or the second IP address to the network computers.

Preferably, the computer system further includes a fourth node for performing communication with the first nodes.

Preferably, the first IP address is an IP address used for communication between each group including one or more of the first nodes and the fourth node, the second IP address is an IP address for communication between arbitrary one of the first nodes and the second nodes, the first nodes perform communication with the fourth node using the first IP address assigned thereto, and the second nodes perform communication with the arbitrary one of the first nodes using the second IP address assigned thereto.

Preferably, the fourth node is a second gateway server for applying communication control for a security measure to the first nodes.

Preferably, in a case where the communication control for the security measure for the first node is performed by the second gateway server, the third node assigns the first IP address with the first netmask having a number of bits smaller than that of the second netmask to the first nodes.

Preferably, the computer system further includes a fifth node for performing communication with the first nodes via the fourth node, and the first nodes further perform communication with the fifth node via the fourth node using the first IP address assigned.

Preferably, the fifth node provides the first nodes with a predetermined function via the fourth node.

Preferably, the first nodes request the third node to assign IP addresses at a predetermined time interval, and the third node assigns the first IP address or the second IP address to the first nodes for requesting assignment of IP addresses.

Further, an IP address assigning apparatus according to the present invention relates to an IP address assigning apparatus for assigning IP addresses used for communication in a network to communication nodes for performing communication in the network and a specific node other than the communication nodes. The communication nodes request reassignment of the IP addresses at predetermined timing. The IP address assigning apparatus includes: assigning means for assigning a general-purpose IP address, which can be used for communication between arbitrary number of the communication nodes, to each of the communication nodes; and reassigning means for, in response to requests for reassignment of IP addresses from the communication nodes, to the communication nodes which have requested the reassignment of IP addresses, reassigning a specific IP address used for communication between the specific node and the communication nodes in a case where the communication between the specific node and the communication nodes is performed, and reassigning the general-purpose IP address in other cases.

Preferably, the reassigning means sequentially reassigns, in response to the request for reassignment of IP addresses from the communication node, the specific IP address to all the communication nodes in a case where the communication between the specific nodes and the communication nodes is performed.

Preferably, the assigning means assigns a general-purpose IP address with a general-purpose netmask used for communication between arbitrary one of the communication nodes to each of the communication nodes, and the reassigning means, in response to requests for reassignment of IP addresses from the communication nodes, to the communication nodes which have requested the reassignment of IP addresses, reassigns the specific IP address with a specific netmask used for communication between the specific node and the communication nodes in a case where the communication between the specific node and the communication nodes is performed, and reassigns the general-purpose IP address with a general-purpose netmask used for the communication between arbitrary one of the communication nodes in other cases.

Further, a communication method according to the present invention relates to a communication method of performing communication in a network using a first IP address with a first netmask having a predetermined number of bits and a second IP address with a second netmask having a number of bits different from that of the first netmask. The network includes first to third nodes each of which being one or more nodes, each of the first nodes performs communication using the first IP address or the second IP address, each of the second nodes performs communication using the second IP address, and the third nodes selectively assign the first IP address or the second IP address to the first nodes.

Preferably, the first IP address is an IP address used for communication between each group including one or more of the first nodes and the fourth node, the second IP address is an IP address for communication between arbitrary one of the first nodes and the second nodes, the first nodes perform communication with the fourth node using the first IP address assigned, and the second nodes perform communication with arbitrary one of the first nodes using the second IP address assigned.

Further, an IP address assigning method of the present invention relates to an IP address assigning method of assigning IP addresses used in communication in a network to communication nodes for performing communication in the network and a specific node other than the communication nodes. The communication nodes request reassignment of the IP addresses at predetermined timing. The IP address assigning method includes: assigning a general-purpose IP address used for communication between arbitrary number of the communication nodes to each of the communication nodes; and in response to requests for reassignment of IP addresses from the communication nodes, to the communication nodes which have requested the reassignment of IP addresses, reassigning a specific IP address used for communication between the specific node and the communication nodes in a case where communication between the specific node and the communication nodes is performed, and reassigning the general-purpose IP address in other cases.

Further, a first program according to the present invention is a program for performing communication in a network using a first IP address with a first netmask having a predetermined number of bits and a second IP address with a second netmask having a number of bits different from that of the first netmask. The network includes first to third nodes each of which being one or more nodes. The first program causes a computer to execute the steps of: performing, by each of the first nodes, communication using the first IP address or the second IP address; performing, by each of the second nodes, communication using the second IP address; and selectively assigning, by the third nodes, the first IP address or the second IP address to the first nodes.

Preferably, the first IP address is an IP address used for communication between each group including one or more of the first nodes, and the fourth node, the second IP address is an IP address for communication between arbitrary one of the first nodes and the second nodes, the step of performing communication in each of the first nodes includes performing communication with the fourth node using the first IP address assigned, and the step of performing communication in each of the second nodes includes performing communication with arbitrary one of the first nodes using the second IP address assigned.

Further, a second program according to the present invention is a program for assigning IP addresses used in communication in a network to communication nodes for performing communication in the network and a specific node other than the communication nodes. The communication nodes request reassignment of the IP addresses at predetermined timing. The second program causes a computer to execute the steps of: assigning a general-purpose IP address used for communication between arbitrary number of the communication nodes to each of the communication nodes; and in response to requests for reassignment of IP addresses from the communication nodes, to the communication nodes which have requested the reassignment of IP addresses, reassigning a specific IP address used for communication between the specific node and the communication nodes in a case where communication between the specific node and the communication nodes is performed, and reassigning the general-purpose IP address in other cases.

EFFECTS OF THE INVENTION

According to the present invention, there are provided a computer system that is improved to be capable of using IP addresses more flexibly in a network by contriving a method of using netmasks, and a method thereof.

According to the present invention, there are provided a computer system that is improved to be capable of providing computers connected to a network with various functions by contriving netmasks and a method of assigning IP addresses with netmasks, and a method thereof.

According to the present invention, there are provided a computer system capable of easily taking measures concerning computer security, and a method thereof.

BRIEF DESCRIPTION OF THE DRAWINGS

FIG. 5 is a diagram illustrating hardware configuration of a DHCP server, a first GW server, a second GW server, a security measure server, a security check server, a client computer, and the like.

BEST MODE FOR CARRYING OUT THE INVENTION

Embodiments of the present invention will be hereinafter explained.

(Computer Network System 1)

Figure 1:
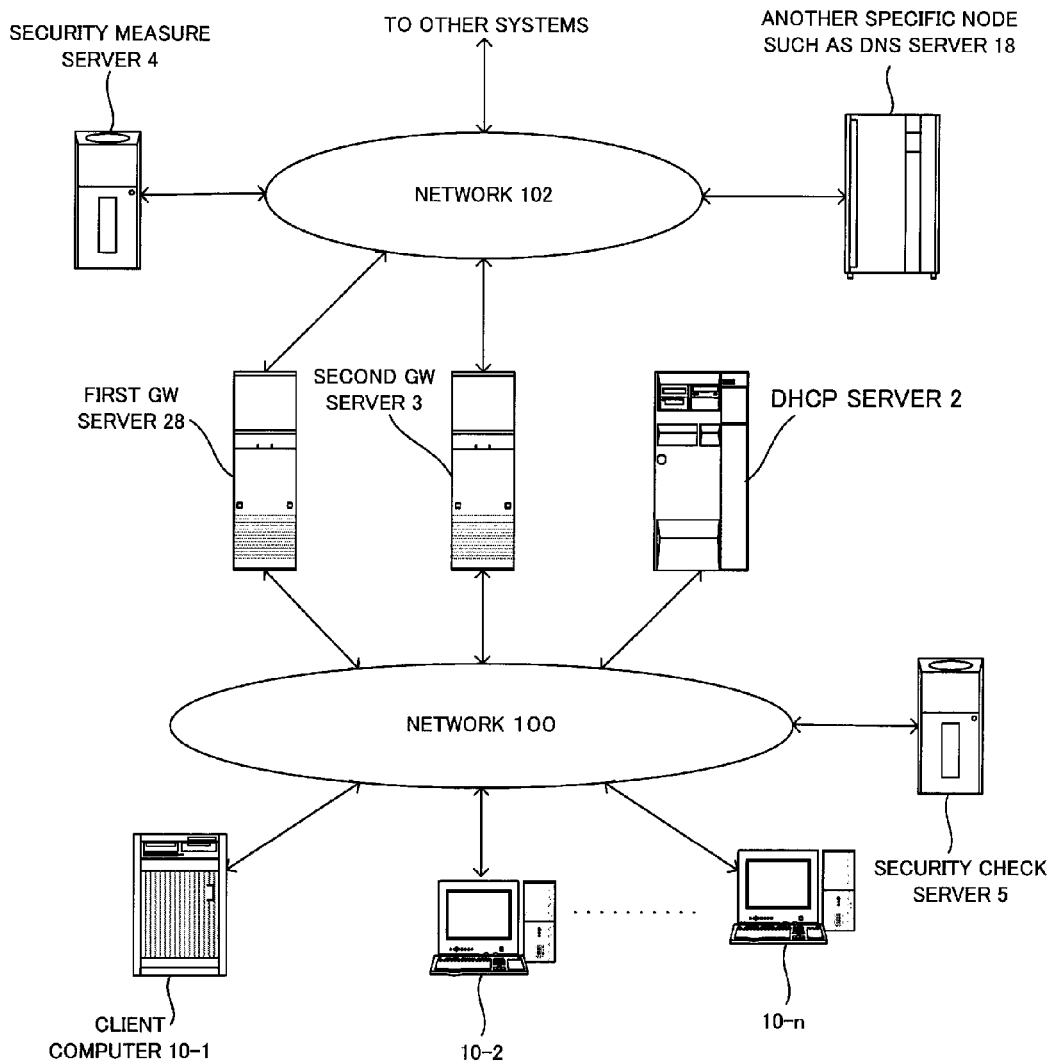
FIG. 1 is a diagram illustrating a configuration of a computer network system according to the present invention.

FIG. 1 is a diagram illustrating a configuration of a computer network system 1 according to the present invention.

As shown in FIG. 1, in the computer network system 1, client computers 10-1 to 10-$n$ (a first node: n is an integer equal to or larger than 1), a DHCP server 2 (a third node), and a security check server 5 are connected so as to be capable of communicating with each other via a first network 100 such as a LAN or a WAN.

A security measure server 4 (a fifth node) and another specific node 18 such as a domain name server (DNS) are connected so as to be capable of communicating with each other via a second network 102 similar to the network 100.

Further, the networks 100 and 102 are connected so as to be capable of communicating with each other via a general first gateway server (a second node; a first GW server) 28 and second gateway server 3 (a fourth node; a second GW server 3 (described later with reference to FIG. 9 and the like)) that perform processing such as protocol conversion between the networks.

The networks 100 and 102 may be further connected to other network systems such as other LANs, WANs, and the Internet.

The computer network system 1 can take various configurations such as a configuration in which the DHCP server 2, the first GW server 28, and the security check server 5 are integrally configured.

When a plurality of components such as the client computers 10-1 to 10-$n$ are shown without specifying any one of the components, the client computers are simply described as the client computers 10 below.

In the respective figures, same components are denoted by the same reference symbols.

Figure 2:
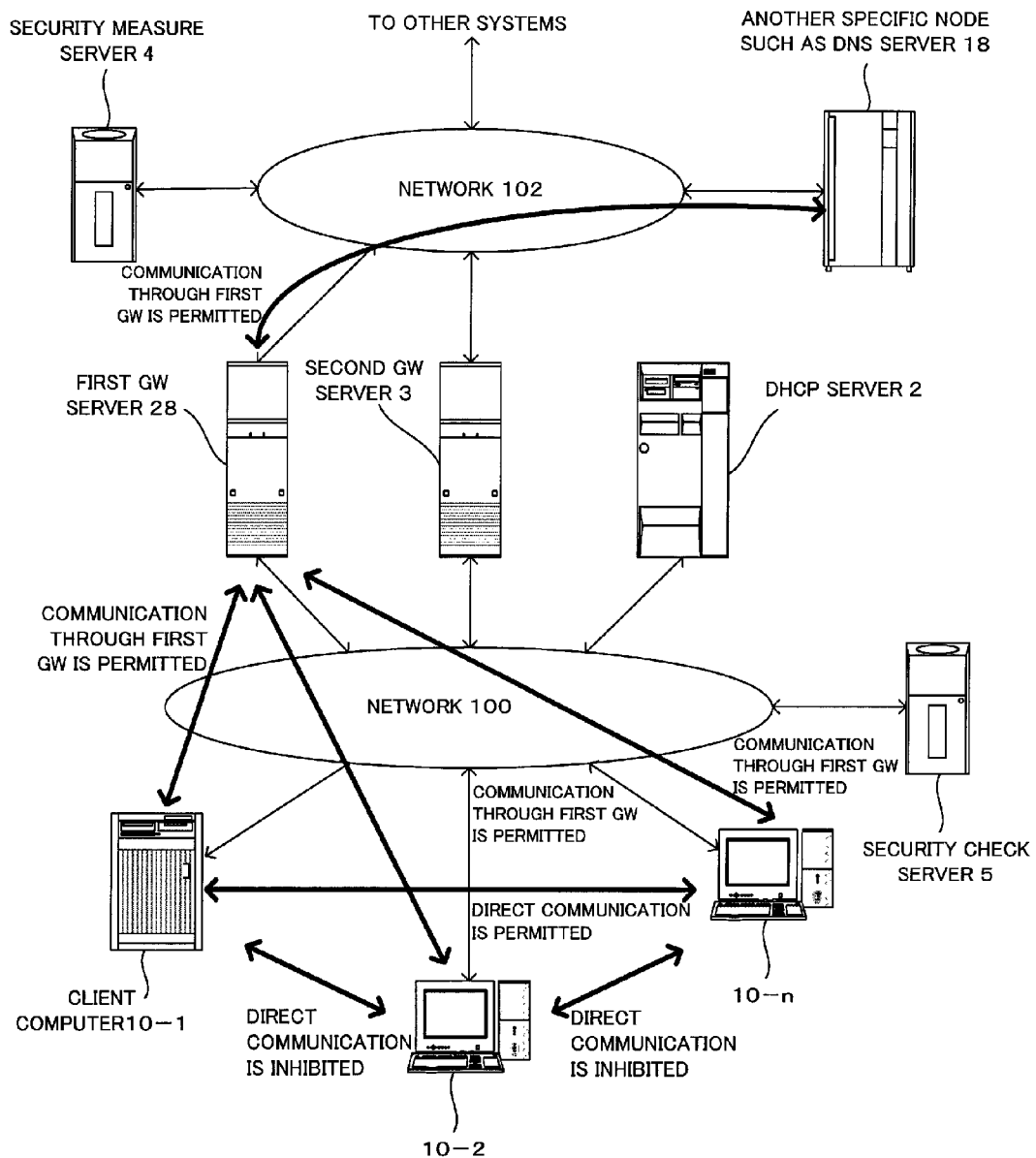
FIG. 2 is a first diagram illustrating an aspect of communication in the computer network system shown in FIG. 1, and specifically an aspect of normal communication in a computer network system 1.
Figure 3:
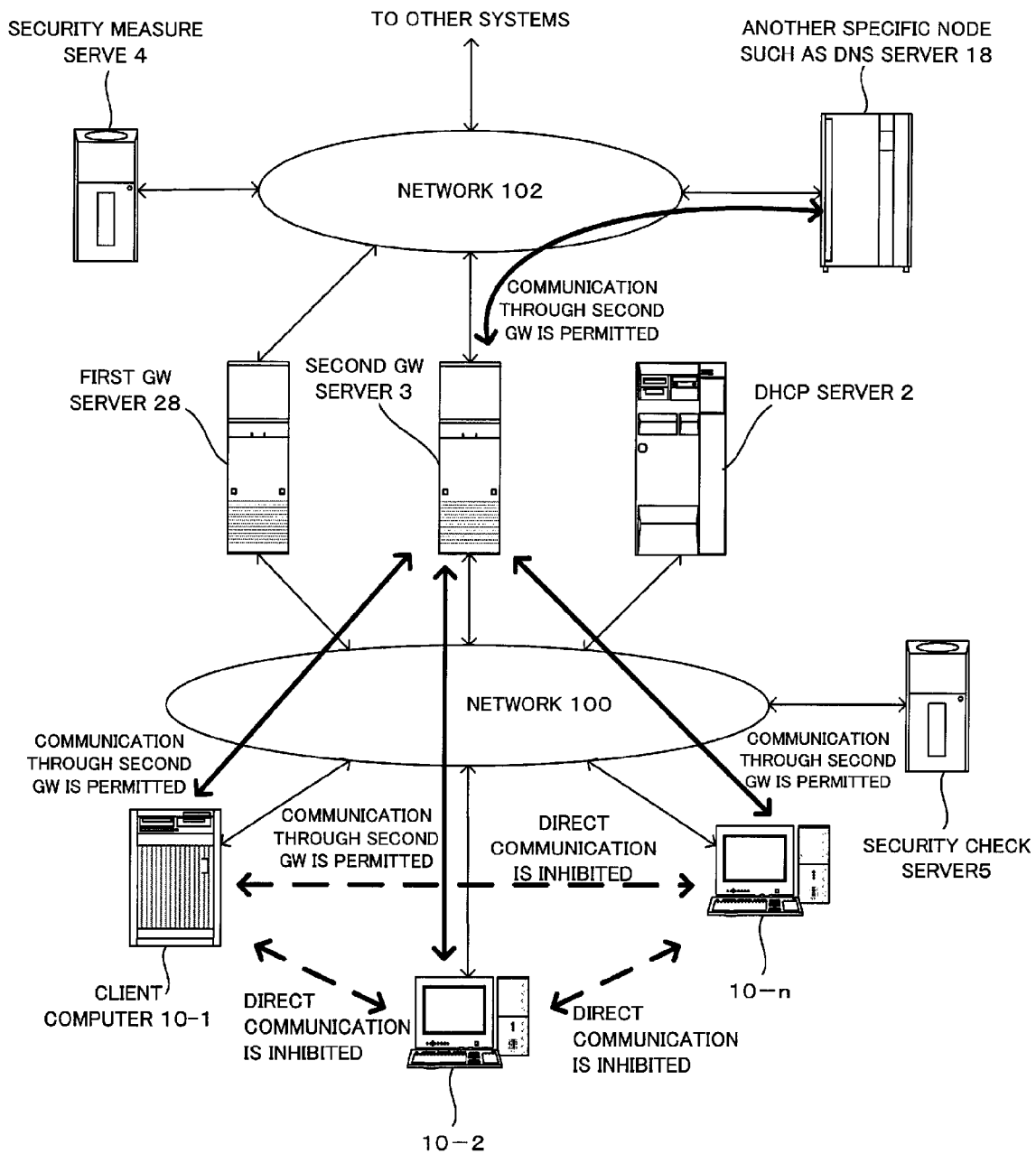
FIG. 3 is a second diagram illustrating an aspect of communication in the computer network system shown in FIG. 1, and specifically an aspect of communication between a second GW and a client.
Figure 4:
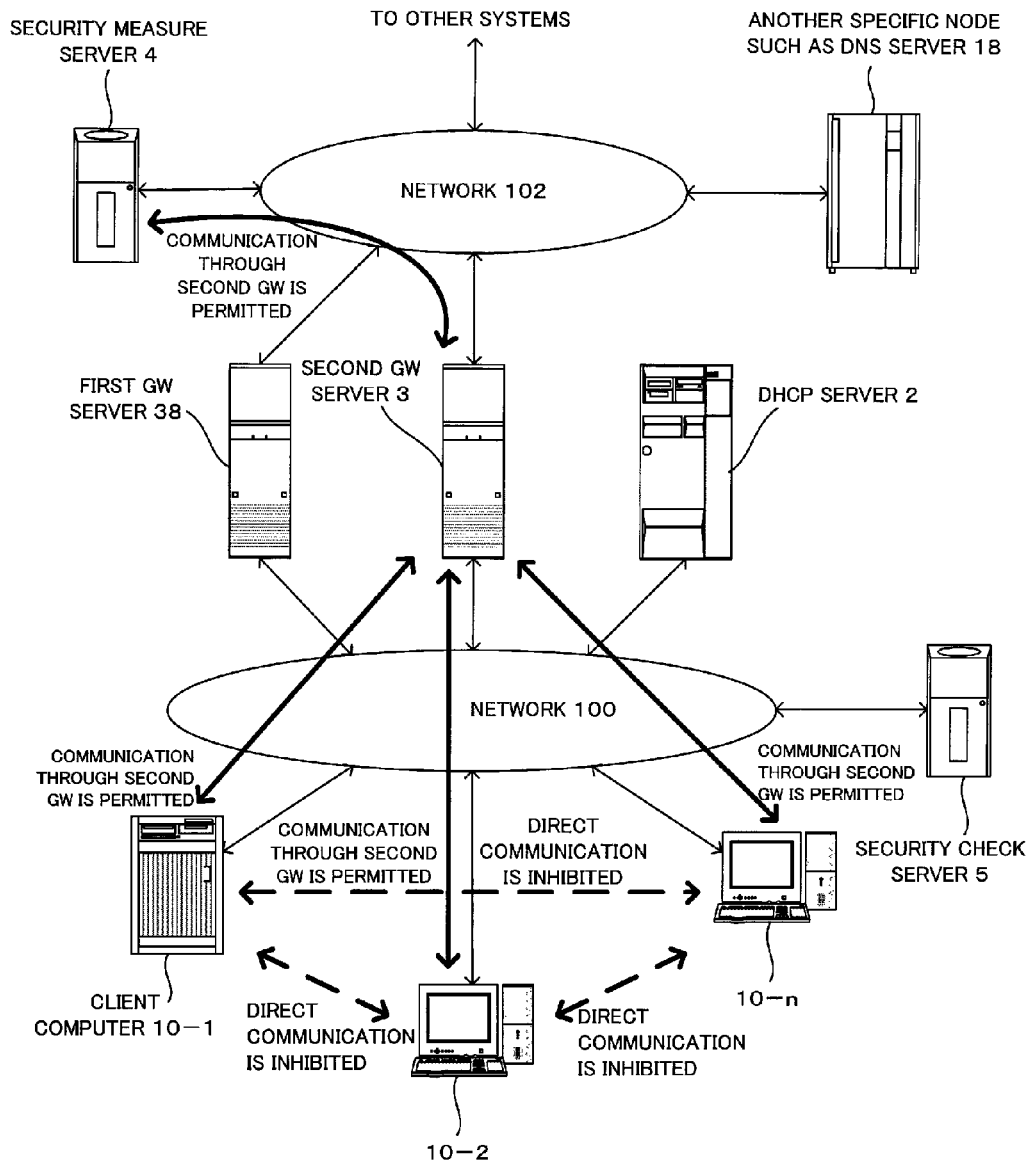
FIG. 4 is a third diagram illustrating an aspect of communication in the computer network system shown in FIG. 1, specifically an aspect of communication during security measure communication.

FIGS. 2 to 4 are first to third diagrams illustrating aspects of communication in the computer network system 1 shown in FIG. 1, respectively. FIG. 2 shows an aspect of normal communication in the computer network system 1, FIG. 3 shows an aspect of communication between a second GW and a client, and FIG. 4 shows an aspect during security measure communication.

In the computer network system 1, assignment of IP addresses and following communications (1) to (3) using the IP addresses assigned are performed by those components.

(1) As shown in FIG. 2, in the network 100, when there is no security abnormality such as viral infection, the first GW server 28 and the client computers 10 are assigned IP addresses (second IP addresses, general-purpose IP addresses) with netmasks (second netmasks, general-purpose netmasks) having the same number of bits (e.g. 24 bits).

In this case, in the computer network system 1, the first GW server 28 and the client computers 10 are allowed to perform communication with other arbitrary nodes by using an IP address with a 24-bit netmask (with which communications with 256 other nodes at the maximum is possible).

Consequently, one or more of the following communications are performed (normal communication):

(a) communication between the arbitrary client computers 10;

(b) communication between the client computers 10 and the first GW server 28;

(c) communication between client computers 10 via the first GW server 28;

(d) communication between the client computers 10 and the specific node 18; and (e) communication between the client computers 10 and the specific node 18 via the first GW server 28.

(2) As shown in FIG. 3, in the computer network system 1, when abnormality such as viral infection occurs, provision of a service is necessary such as addition or replacement of software of all the client computers 10, or the like, each of the client computers 10 is sequentially assigned an IP address (a first IP address, a specific IP address) with a netmask (a first netmask, a specific netmask; e.g., 30 bits), with which communication with only the second GW server 3 is possible, while the assignment of the IP address to the first GW server 28 is kept.

In this case, in the computer network system 1, the second GW server 3 is allowed to perform communication with all the other nodes by using an IP address with a 22-bit netmask. Each of the client computers 10 is allowed to perform communication with the second GW server 3 and communication with the other nodes via the second GW server 3 by using an IP address with a 30-bit netmask (with which communications with only one other node is possible).

Consequently, in the computer network system 1, one or more of the following communications are performed:

(b) communication between the client computers 10 and the second GW server 3;

(c) communication between the client computers 10 via the second GW server 3; and (e) communication between the client computers 10 and the specific node 18 (the security measure server 4 may be included. The same applies in the following description) via the second GW server 3.

Further, inhibited (communication between the second GW server and the client) are:

(a) communication between the arbitrary client computers 10 without an intervention of the second GW server 3; and (d) communication between the client computers 10 and the specific node 18 without an intervention of the second GW server 3.

(3) As shown in FIG. 4, in the computer network system 1, when abnormality such as viral infection occurs, each of the client computers 10 is assigned an IP address with a netmask (e.g., 30 bits), with which communicate with only the security measure server 4 via the second GW server 3 is possible, while the assignment of the IP address to the first GW server 28 is kept.

In this case, in the computer network system 1, the second GW server 3 is allowed to perform communication with all the client computers 10 by using an IP address with a 22-bit netmask (with which communications with 1021 other nodes at the maximum is possible).

On the other hand, in this case, each of the client computers 10 is allowed to only perform communication with the security measure server 4 via the second GW server 3 by using an IP address with a 30-bit netmask (with which communications with only one other node is possible).

Consequently, only performed is:

(f) communication between each of the client computers 10 and the security measure server 4 via the second GW server 3.

Security measures are applied to all the client computers 10 simultaneously (during security measure communication).

Note that, it is possible to provide the client computers 10 with various functions by replacing the security measure server 4 with various nodes that provide other functions such as a data server or a program server or including servers that provide various functions in the specific node 18.

However, to embody and clarify the explanation, hereinafter a specific example is provided in which the computer network system 1 provides the client computers 10 with only the security measure function.

Similarly, the number of bits of a netmask can take values other than 24 and 30. In the following explanation, a specific example is provided in which: the number of bits of netmasks attached to IP addresses assigned to the client computers 10 during the normal communication (FIG. 2) is 24; the number of bits of netmasks attached to IP addresses assigned to the client computers 10 during other communication (FIGS. 3 and 4) is 30; the number of bits of a netmask attached to an IP address assigned to the first GW server 28 is always 24; and the number of bits of a netmask attached to an IP address assigned to the second GW server 3 is always 22.

Similarly, in the following explanation, a specific example is provided in which only the normal communication shown in FIG. 2 or the security measure communication shown in FIG. 4 is performed in the computer network system 1.

(Hardware)

Figure 5:
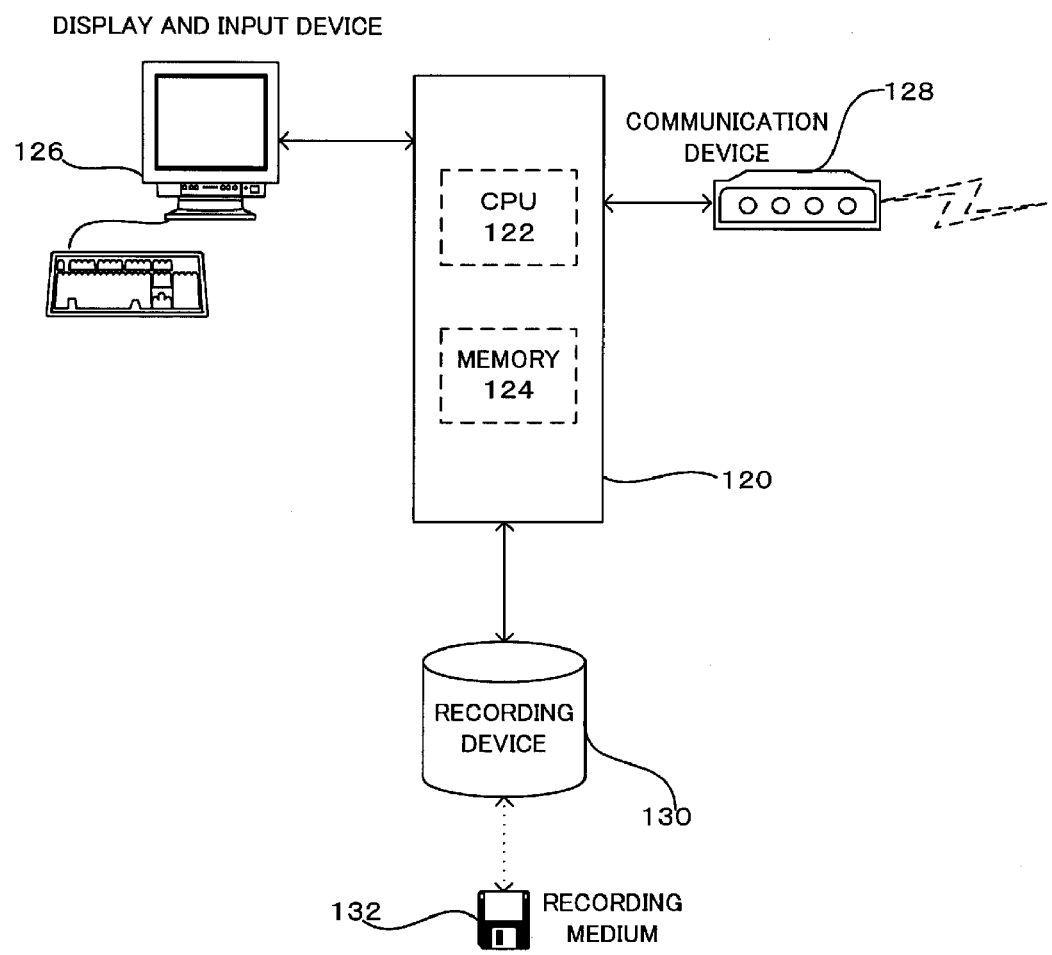

FIG. 5 is a diagram illustrating a hardware configuration of the DHCP server 2, the first GW server 28, the second GW server 3, the security measure server 4, the security check server 5, the client computer 10, and the other nodes 18 shown in FIG. 1.

As shown in FIG. 5, each of the nodes of the computer network system 1 is configured by a computer main body 120 including a CPU 122 and a memory 124, a display and input device 126 including a display device, a keyboard, and the like, a communication device 128 that performs communication with other nodes via the network 100, and a recording device 130 such as an HD device or a CD device.

In other words, each of the nodes of the computer network system 1 includes components as computers capable of communicating with the other nodes via the networks 100 and 102.

(Programs)

Programs executed in each of the nodes of the computer network system 1 will be hereinafter explained.

The following programs are, for example, supplied to each of the nodes via the recording medium 132 (FIG. 5), loaded to the memory 124, and executed on an operating system (OS), which generally operates in each of the nodes, by specifically using hardware of each of the nodes.

(Client Program 14)

Figure 6:
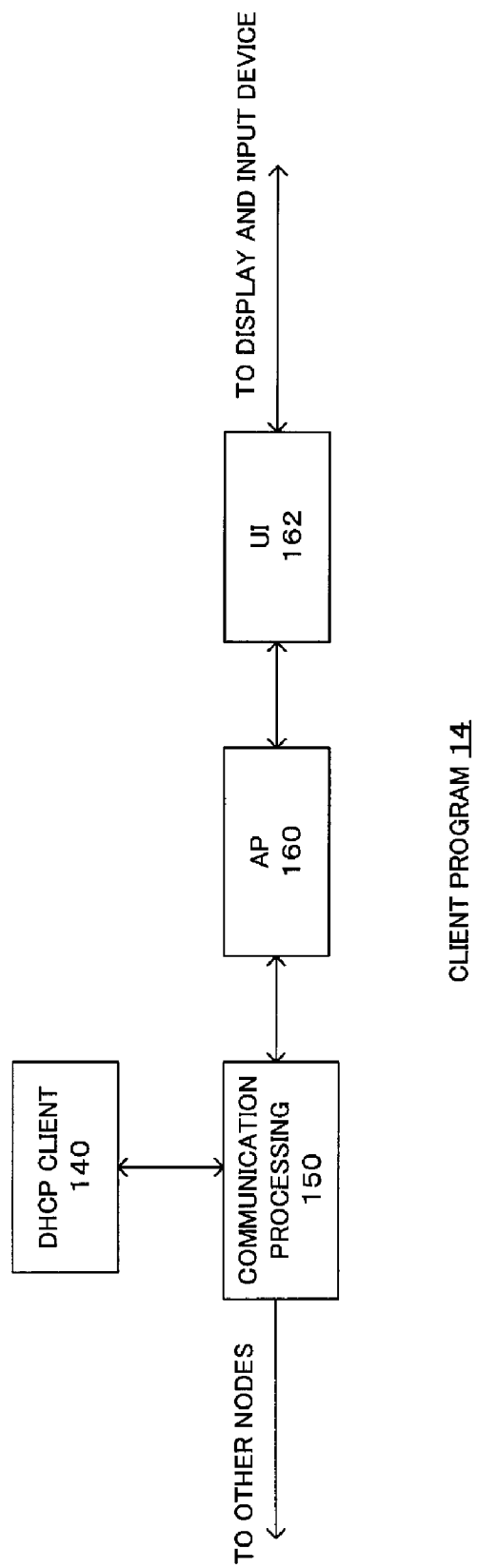
FIG. 6 is a diagram showing a client program which operates in the client computer shown in FIG. 1.

FIG. 6 is a diagram showing a client program 14 which operates in the client computer 10 shown in FIG. 1.

As shown in FIG. 6, the client program 14 includes a DHCP client section 140, a communication processing section 150, an application program (AP) 160, and a user interface (UI) section 162.

The client program 14 is assigned an IP address from the DHCP server 2, performs communication with the other nodes, and provides a user with various functions using those components.

In the client program 14, the DHCP client section 140 realizes a function of a general DHCP client according to the DHCP.

The DHCP client section 140 requests the client program 14 to assign an IP address and receives an IP address and a netmask (a 24-bit general-purpose netmask) of the IP address assigned by the DHCP server 2 in response to this request.

The DHCP client section 140 requests the DHCP server 2 to reassign an IP address at a predetermined period (e.g., every several minutes) in accordance with a setting by the DHCP server 2 and is assigned an IP address and a netmask (a general-purpose netmask during the normal communication (FIG. 2) or a 30-bit specific netmask during the other communication (during the security measure communication; FIG. 4) of the IP address reassigned by the DHCP server 2 in accordance with this request.

The DHCP client section 140 further receives, other than an IP address and a netmask of the IP address, information necessary for communication in the computer network system 1 such as an IP address of the DHCP server 2, IP addresses of the first GW server 28 and the second GW server 3, an interval of a reassignment request, and an IP address of the DNS server, from the DHCP server 2.

Those pieces of information received by the DHCP client section 140 from the DHCP server 2 are outputted to the communication processing section 150 and used for communication with the other nodes.

The communication processing section 150 performs communication with the other nodes in the aspects shown in FIGS. 2 to 4 using the IP address and the netmask of the IP address inputted from the DHCP client section 140.

In the client computer 10, the communication processing section 150 performs communication with the other arbitrary nodes as shown in FIG. 2 when the number of bits of the netmask inputted from the DHCP client section 140 is 24.

Alternatively, in the client computer 10, the communication processing section 150 performs communication with the client computers 10 and the security measure server 4 via the DHCP server 2 in the mode shown in FIG. 4 when the number of bits of the netmask inputted from the DHCP client section 140 is 30.

The AP 160 provides the user with application functions such as a Web browser and a word processor.

The UI section 162 accepts operation by the user on the display and input device 126 (FIG. 5) or the like and outputs the operation of the user accepted to the other components.

The UI section 162 controls processing by the other components in accordance with the operation accepted.

The UI section 162 displays information obtained as a result of the processing by the other components on the display and input device 126 and indicates the information to the user.

(DHCP Program 20)

Figure 7:
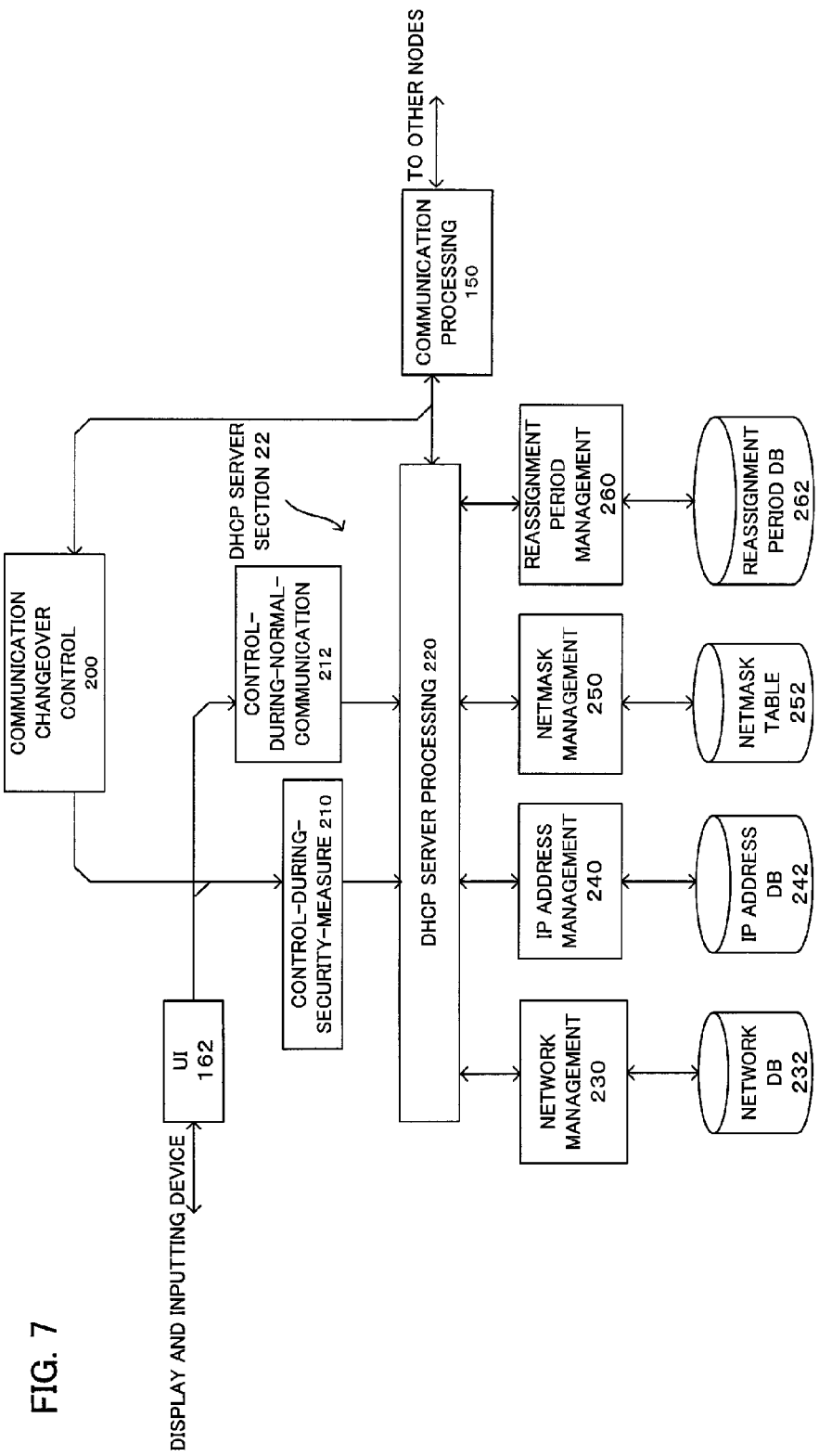
FIG. 7 is a diagram showing a DHCP server program which operates in the DHCP server shown in FIG. 1.

FIG. 7 is a diagram showing a DHCP server program 20 which operates in the DHCP server 2 shown in FIG. 1.

As shown in FIG. 7, the DHCP server program 20 includes a UI section 162, a communication changeover control 200, a control-during-security-measure section 210, a control-during-normal-communication section 212, a DHCP-server processing section 22, and a communication processing section 150.

The DHCP server section 22 includes a DHCP-server processing section 220, a network managing section 230, a network database (a network DB) 232, an IP-address managing section 240, an IP address DB 242, a netmask managing section 250, a netmask table 252, a reassignment-period managing section 260, and a reassignment period DB 262.

The DHCP server 20 provides each of the nodes of the computer network system 1 with functions of a general DHCP server according to the DHCP using these components.

In other words, the DHCP server program 20 assigns a general-purpose IP address with a 24-bit general-purpose netmask to the client computer 10 when the normal communication (FIG. 2) is performed in the computer network system 1 and when the security measure (FIG. 4) is successfully completed in the computer network system 1.

The DHCP server program 20 connects all the client computers 10 to the security measure server 4 via the second GW server 3 and causes the security measure server 4 to perform a security measure for the client computers 10 when the security measure communication (FIG. 4) is performed in the computer network system 1.

In the DHCP server program 20, the communication changeover control section 200 boots up the control-during-normal-communication section 212 when the normal communication (FIG. 2) is performed in the computer network system 1.

The communication changeover control section 200 boots up the control-during-security-measure section 210 when the security measure communication (FIG. 4) is performed in the computer network system 1.

Examples of timing for the communication changeover control section 200 to boot up the control-during-security-measure section 210 include:

(1) a case where operation for performing a security measure is performed in the computer network system 1 by a user (an administrator of the computer network system 1) of the DHCP server 2; and (2) a case where detection of specific vulnerability on security in the computer network system 1 is notified from the security check server 5.

Examples of timing for the communication changeover control section 200 to boot up the control-during-normal-communication section 212 include:

(1) a case where operation for completing a security measure in the computer network system 1 is performed by the user of the DHCP server 2; and (2) a case where acceptance in a security check in the computer network system 1 is notified from the security check server 5.

When the control-during-security-measure section 210 is booted up by the communication changeover control section 200, the control-during-security-measure section 210 controls the DHCP server section 22 to reassign a specific IP address with a specific netmask to each of the client computers 10 in the case of reassignment of IP addresses.

When the control-during-normal-communication section 212 is booted up by the communication changeover control section 200, the control-during-normal-communication section 212 controls the DHCP server section 22 to assign a general-purpose IP address with a general-purpose netmask to each node in the computer network system 1.

The network managing section 230 manages information on the computer network system 1 used for DHCP processing and stores the information in the network DB 232.

The network managing section 230 provides the information on the computer network system 1 stored in the necessity of processing in the DHCP server processing section 220.

The IP-address managing section 240 stores an IP address, which can be assigned or reassigned to each of the nodes of the computer network system 1, in the IP address DB 242 and manages the IP address stored.

The IP-address managing section 240 provides the IP address stored in the necessity of processing in the DHCP-server processing section 220.

The netmask managing section 250 stores a general-purpose netmask used during the normal communication and a specific netmask used during the security measure communication in the netmask table 252 and manages the netmasks.

The netmask managing section 250 provides the netmasks stored in the necessity of processing in the DHCP server processing section 220.

The reassignment-period managing section 260 stores a reassignment period for an IP address set for each of the nodes of the network computer system 1 in the reassignment period DB 262 and manages the reassignment period stored.

The reassignment-period managing section 260 provides the netmasks stored in the necessity of processing in the DHCP server processing section 220.

The DHCP-server processing section 220 performs assignment of an IP address to each of the nodes of the computer system 1 using information provided from the network managing section 230, the IP-address managing section 240, the netmask managing section 250, and the reassignment-period managing section 260 in accordance with the control by the control-during-security-measure section 210 or the control-during-normal-communication section 212.

Similarly, the DHCP-server processing section 220 performs assignment and reassignment of the general-purpose IP address to each of the client computer 10 in accordance with the control by the control-during-normal-communication section 212.

The DHCP-server processing section 220 performs reassignment of the specific IP address to the client computer 10 in accordance with the control by the control-during-security-measure section 210.

The DHCP-server processing section 220 performs setting of a period of reassignment of an IP address to each of the nodes of the computer network system 1, notification of IP addresses of the first GW server 28, the second GW server 3, and the DHCP server 2 to the client computer 10, notification of an IP address of the DNS server to each of the nodes of the computer network system 1, and the like.

Figure 8:
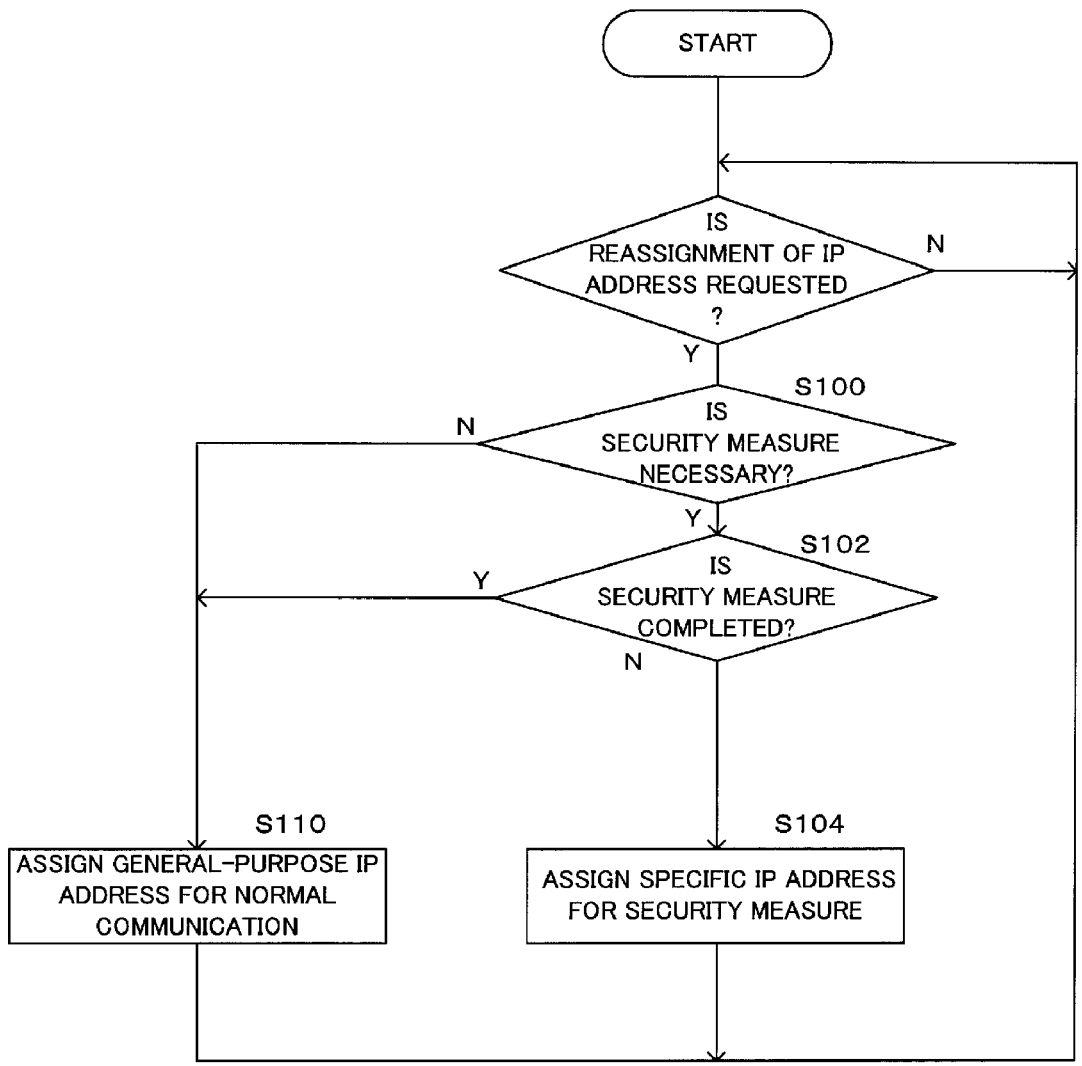
FIG. 8 is a flowchart showing processing (S10) by the DHCP server program shown in FIG. 7.

FIG. 8 is a flowchart showing processing (S10) by the DHCP server program 20 shown in FIG. 7.

As shown in FIG. 8, in Step 100 (S100), the communication changeover control section 200 of the DHCP server 2 judges whether a security measure in the computer network system 1 is required according to operation by the user of the DHCP server 2 or notification from the security check server 5.

In a case where the security measure is required, the DHCP server program 20 proceeds to processing in S102. In other cases, the DHCP server program 20 proceeds to processing in S110.

In Step 102 (S102), the communication change over control section 200 of the DHCP server 2 judges whether the security measure in the computer network system 1 is completed according to operation by the user of the DHCP server 2 or completion of processing in the security check server 5.

In a case where the security measure is completed, the DHCP server program 20 proceeds to processing in S110. In other cases, the DHCP server program 20 proceeds to processing in S104.

In Step 104 (S104), the communication changeover control section 200 boots up the control-during-security-measure section 210.

The control-during-security-measure section 210 controls the DHCP server section 22 to perform assignment of an IP address (a specific IP address) used for the security measure to the client computer 10.

In Step 110 (S110), the communication changeover control section 200 boots up the control-during-normal-communication section 212.

The control-during-normal-communication section 212 controls the DHCP server section 22 to perform assignment and reassignment of an IP address (a general-purpose IP address) used for normal communication to the client computer 10.

Note that, the processing by the DHCP server program 20 shown in FIG. 8 is not only uniformly applied to all the client computers 10 but also selectively applied to a part of the client computers 10.

(GW Server Program 30)

Figure 9:
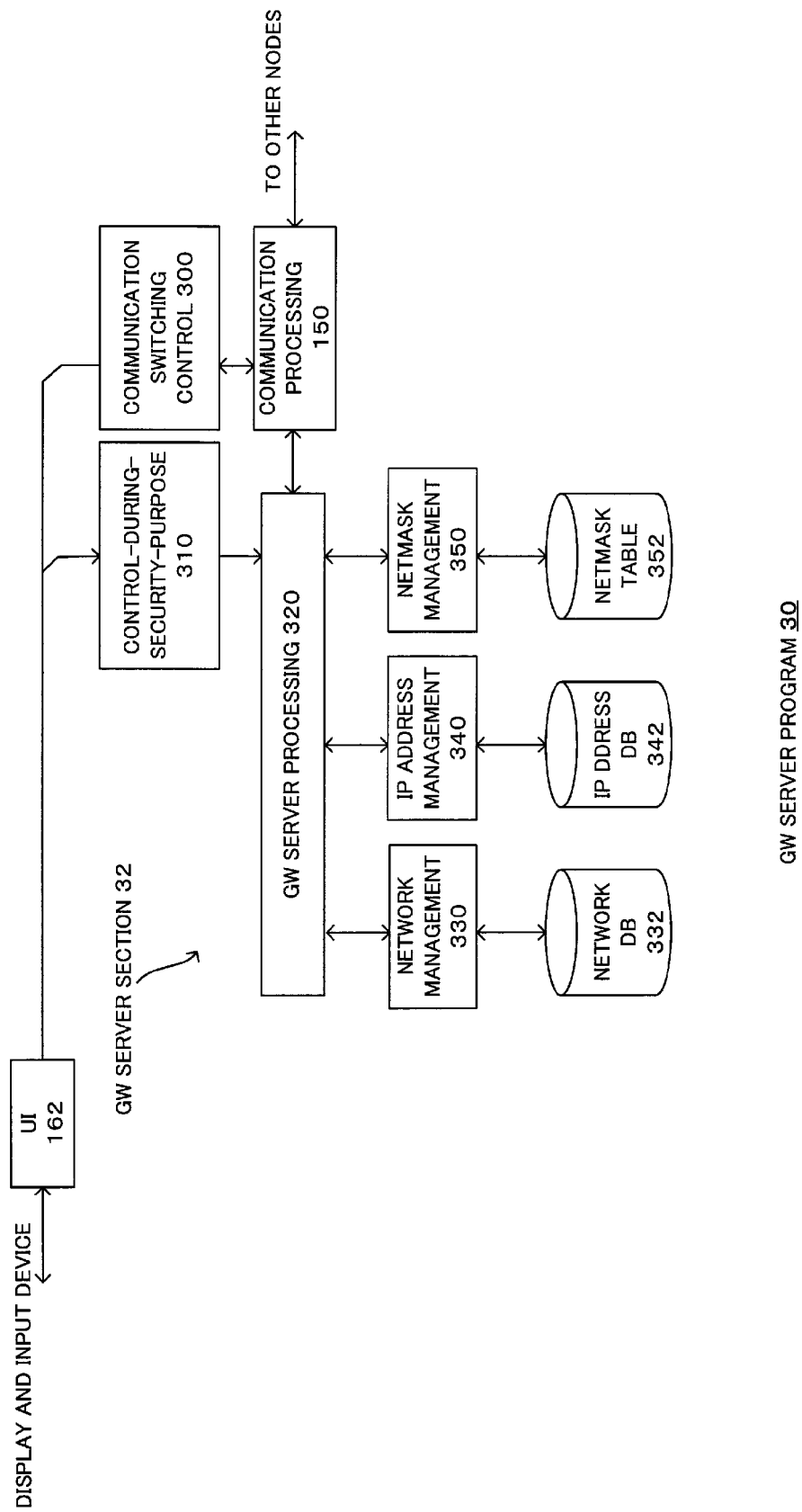
FIG. 9 is a diagram showing a GW server program which operates in the second GW server shown in FIG. 1.

FIG. 9 is a diagram showing a GW server program 30 which operates in the second GW server 3 shown in FIG. 1.

As shown in FIG. 9, the GW server program 30 includes a communication processing section 150, a UI section 162, a communication changeover control section 300, a control-during-normal-communication section 312, a control-during-security-measure section 310, and a GW server section 32.

The GW server section 32 includes a GW-server processing section 320, a network managing section 330, a network DB 332, an IP-address managing section 340, an IP address DB 342, a netmask managing section 350, and a netmask table 352.

The GW server program 30 connects the client computer 10 and the security measure server 4 and causes the client computer 10 and the security measure server 4 to perform communication during anti-virus communication.

In the GW server program 30, the communication changeover control section 300 boots up the control-during-security-measure section 310 when the security measure communication (FIG. 4) is performed in the computer network system 1.

Timing for the communication changeover control section 300 to boot up the control-during-security-measure section 310 is the same as the timing for the communication changeover control section 200 of the DHCP server program 20 (FIG. 7) to start the control-during-security-measure section 210.

When the control-during-security-measure section 310 is booted up by the communication changeover control section 300, the control-during-security-measure section 310 controls the GW server section 32 to provide the client computer 10 with functions required during the security measure communication.

The network managing section 330 manages information on the computer network system 1 used for processing and the like as those by a GW server and stores the information in the network DB 332.

The network managing section 330 provides the information on the computer network system 1 stored in the necessity of processing in the GW-server processing section 320.

The IP-address managing section 340 stores an IP address assigned to the GW client computer 10 and used for the processing and the like as those by the GW server in the IP address DB 342 and manages the IP address stored.

The IP-address managing section 340 provides the IP address stored in the necessity of processing in the GW-server processing section 320.

The netmask managing section 350 stores a general-purpose netmask used during normal communication and a specific netmask used during anti-virus communication and manages the netmasks.

The netmask managing section 350 provides the netmasks stored in the necessity of processing in the GW-server processing section 320.

In accordance with the control by the control-during-security-measure section 310, the GW-server processing section 320 provides, as appropriate, the client computer 10 with, other than processing and the like necessary for connecting the client computer 10 and the security measure server 4, other functions necessary to serve as a firewall, a database, a program server, and the like.

(Security Measure Program 40)

Figure 10:
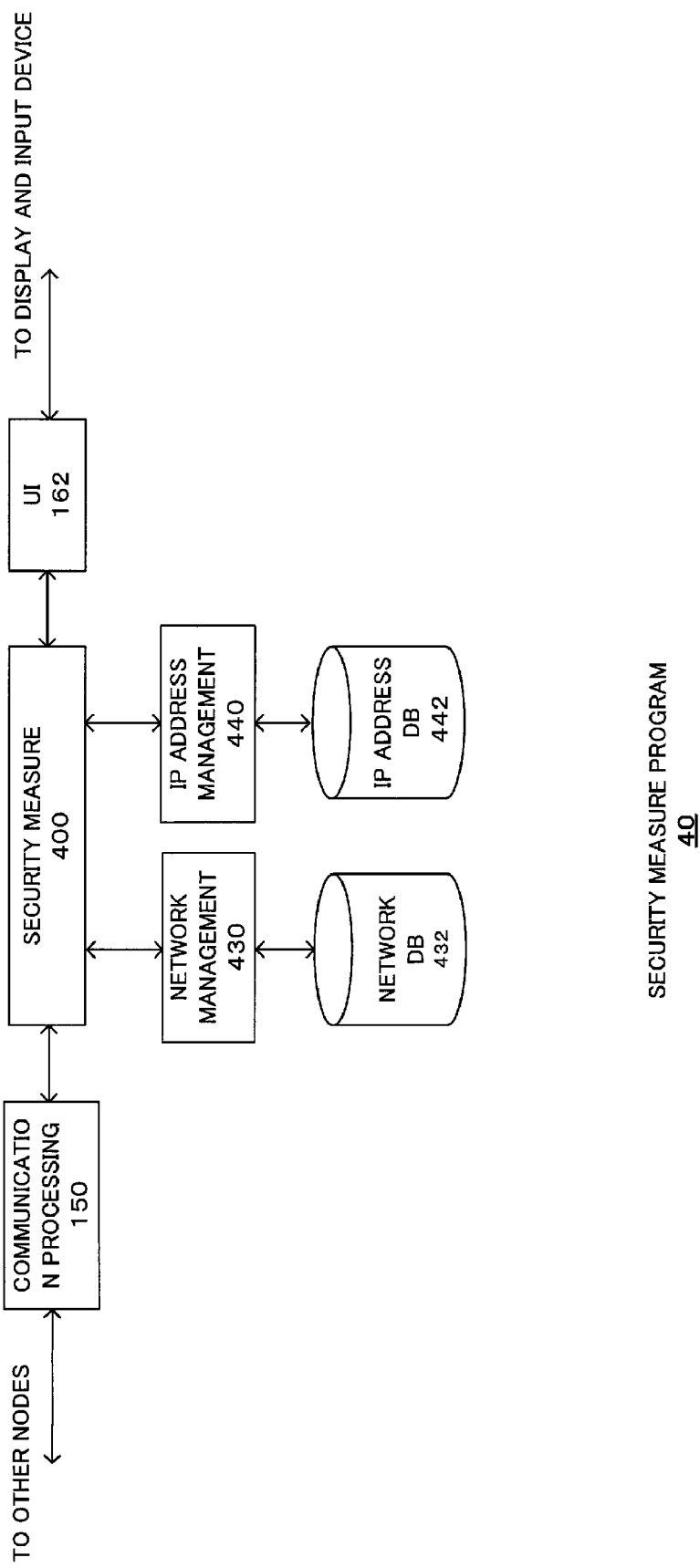
FIG. 10 is a diagram showing an anti-virus program 40 which operates in the anti-virus server shown in FIG. 1.

FIG. 10 is a diagram showing a security measure program 40 which operates in the security measure server 4 shown in FIG. 1.

As shown in FIG. 10, the security measure program 40 includes a communication processing section 150, a UI section 162, a security measure section 400, a network managing section 430, a network DB 432, an IP-address managing section 440, and an IP address DB 442.

The security measure program 40 takes a security measure for the client computer 10 during the security measure communication (FIG. 4) in the computer network system 1 using those components.

The network managing section 430 manages information on the computer network system 1 used for the security measure and stores the information in the network DB 432.

The network managing section 430 provides the information on the computer network system 1 stored in the necessity of processing in the security measure section 400.

The IP-address managing section 440 stores an IP address assigned to the GW client computer 10 and used for the security measure in the IP address DB 442 and manages the IP address stored.

The IP-address managing section 340 provides the IP address stored in the necessity of processing in the security measure section 400.

The security measure section 400 is sequentially connected to and performs communication with the client computers 10 and takes a security measure for the client computers 10 during the security measure communication (FIG. 4).

The examples of functions for the security measure provided by the security measure section 400 includes the following functions as described in the items (1) to (5):

(1) installation of an OS security measure patch and a hot fix to the client computers 10;

(2) update of database for viral infection check for the client computers 10;

(3) removal of a virus infecting the client computers 10;

(4) restoration of a program, data, and the like of the client computers 10 adversely affected by the virus; and (5) update of the AP 160 that causes viral infection.

(Security Measure Program 50)

Figure 11:
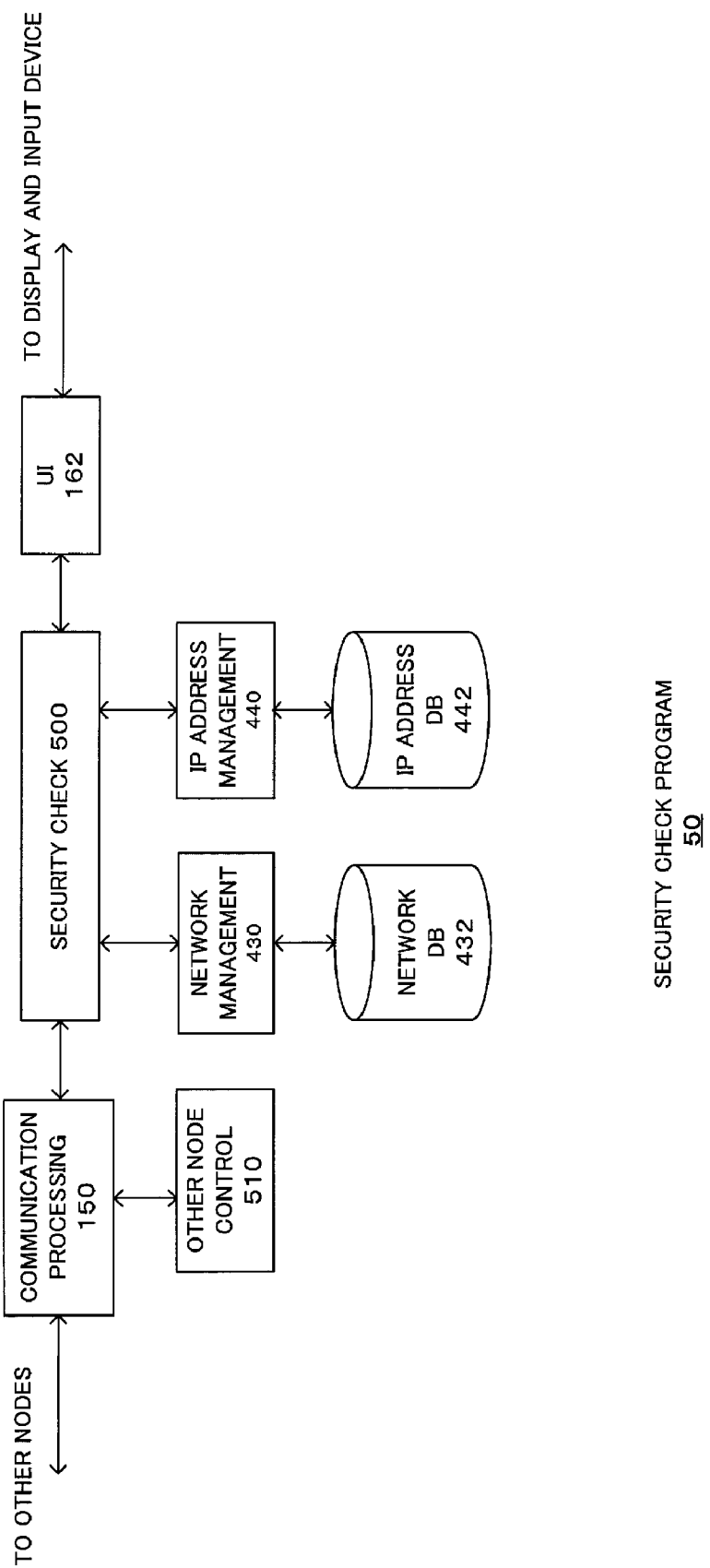
FIG. 11 is a communication sequence diagram showing an operation (S12) during the normal communication (FIG. 2) in the computer network system shown in FIG. 1.

FIG. 11 is a diagram showing a security measure program 50 which operates in the security measure server 5 shown in FIG. 1.

As shown in FIG. 11, the security measure program 50 includes a communication processing section 150, a UI section 162, a security measure section 500, an other-nodes control section 510, a network managing section 530, a network DB 532, an IP-address managing section 540, and an IP address DB 542.

The security measure program 50 constantly performs security check (e.g., detection of computer virus) with respect to the client computer 10 in the computer network system 1 using those components.

In the security check program 50, the communication processing section 150 receives security related information from the client computers 10 and notifies the security check section 500 of the security related information.

The security check section 500 periodically processes the security related information received from the communication processing section 150 and performs security check for the client computers 10.

Further, the security check section 500 notifies the other-nodes control section 510 whether a problem (viral infection, etc.) on security is detected in one or more of the client computers 10 (rejection in the security check) or there is no problem on security in all the client computers 10 (acceptance in the security check) according to the security check.

The other-nodes control section 510 controls the DHCP server 2, the second GW server 3, and the anti-virus server 4 to perform processing for a security measure or processing for completion of the security measure according to operation by the user on the security check server 5 or a result of the security check by the security check section 500.

(Overall Operations of the Computer Network System 1)

Overall operations of the computer network system 1 will be hereinafter explained.

(During Normal Communication)

Figure 12:
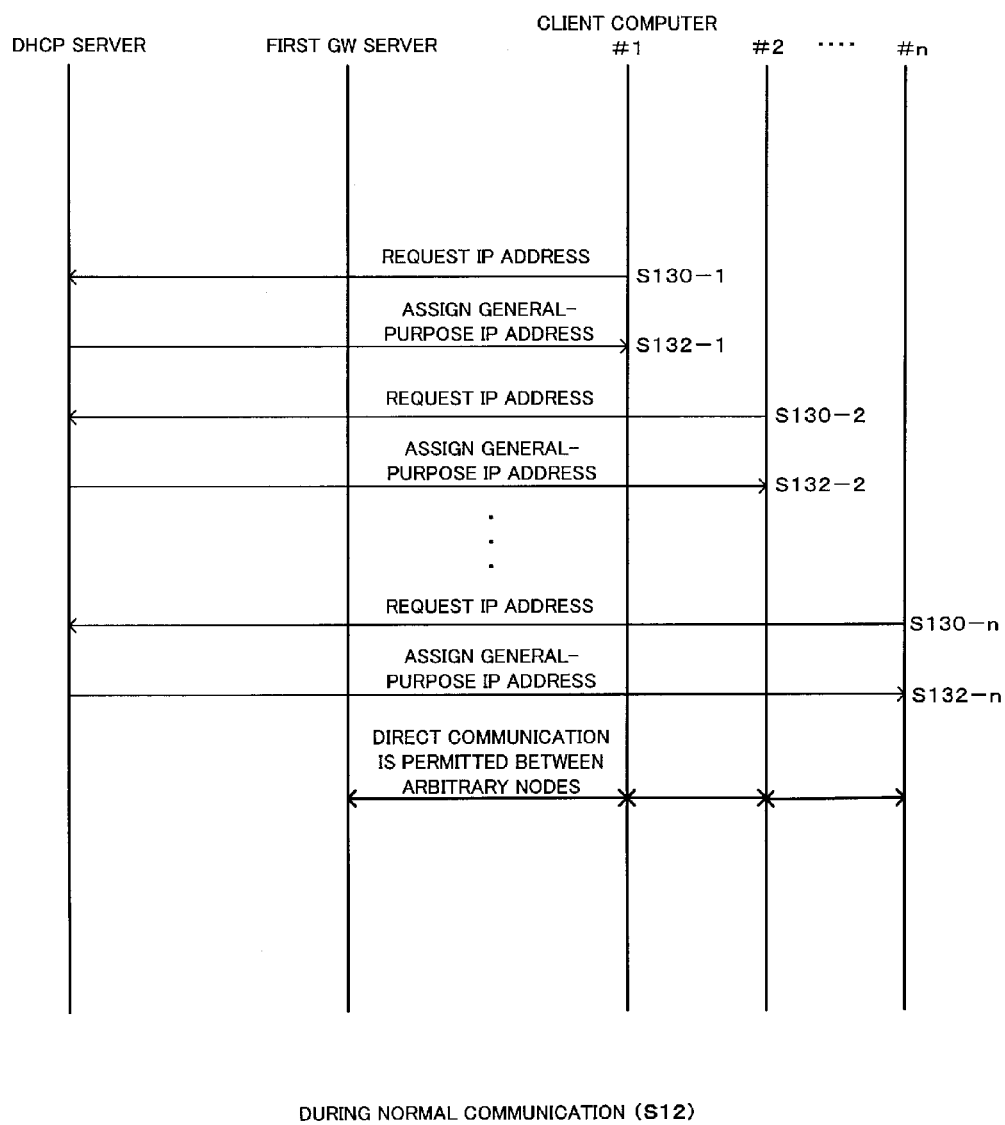
FIG. 12 is a communication sequence diagram showing an operation (S14) at the start of anti-virus communication (FIG. 4) in the computer network system shown in FIG. 1.

FIG. 12 is a communication sequence diagram showing an operation (S12) during the normal communication (FIG. 2) in the computer network system 1 shown in FIG. 1.

In Steps 130-1 to 130-$n$ (S130-1 to S130-$n$), the client computers 10-1 to 10-$n$ sequentially request the DHCP server 2 to assign IP addresses.

In Steps 132-1 to 132-$n$ (S132-1 to S130-$n$), the DHCP server 2 sequentially assigns general-purpose IP addresses to the client computers 10-1 to 10-$n$.

The first GW server 28 and the client computers 10 perform communication with other arbitrary nodes using the general-purpose IP addresses assigned by the DHCP server 2.

(When Security Measure Starts)

Figure 13:
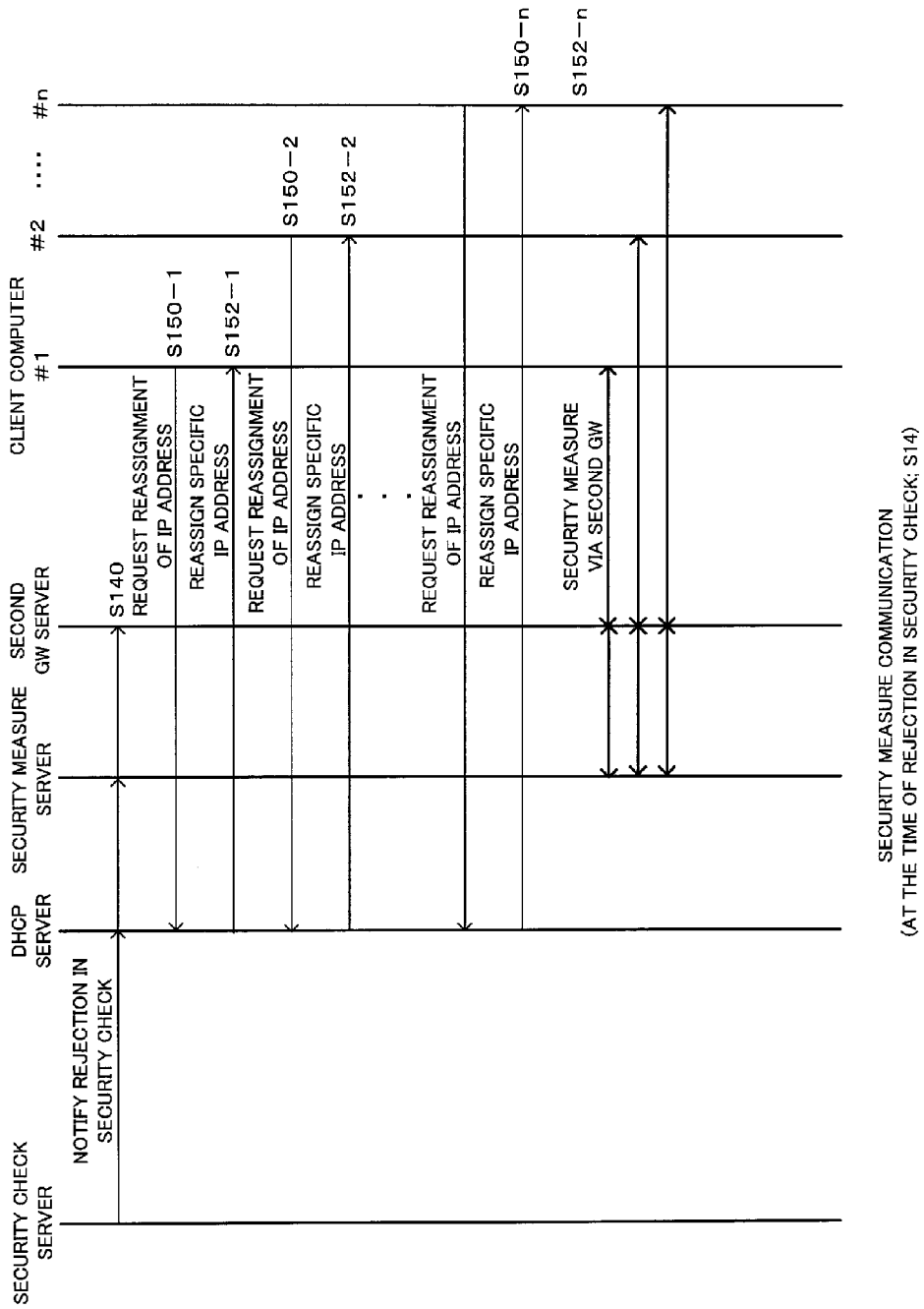
FIG. 13 is a communication sequence diagram showing an operation (S18) at the completion of the anti-virus communication (FIG. 4) in the computer network system shown in FIG. 1.

FIG. 13 is a communication sequence diagram showing an operation (S14) at the start of the security measure communication (FIG. 4) in the computer network system 1 shown in FIG. 1.

As shown in FIG. 13, in Steps 140 and 142 (S140 and S142), for example, when the security check for the client computer 10 ended in rejection, the security check server 5 notifies the DHCP server 2 and the second GW server 3 of start of a security measure.

In Steps 150-1 to 150-$n$ (S150-1 to S150-$n$), the client computers 10-1 to 10-$n$ assigned the general-purpose IP addresses according to the processing in S12 sequentially request the DHCP server 2 to reassign IP addresses.

In Steps 152-1 to 152-$n$ (S152-1 to S152-$n$), the DHCP server 2 sequentially assigns specific IP addresses to the client computers 10-1 to 10-$n$.

The client computers 10 reassigned the specific IP addresses perform communication with the security measure server 4 via the second GW server 3 and subjected to a security measure by the security measure server 4.

(When Security Measure Completes)

Figure 14:
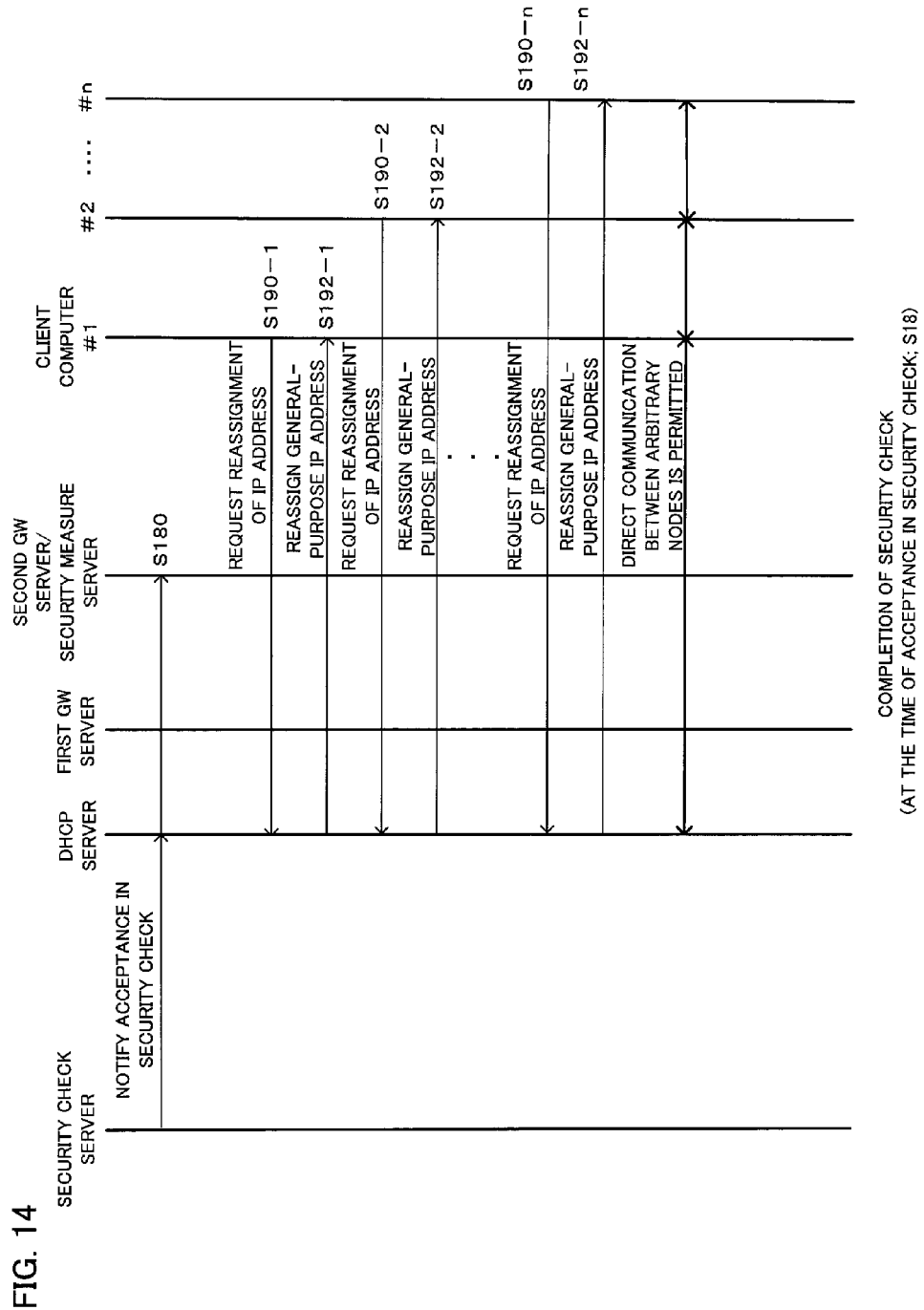
FIG. 14 is a communication sequence diagram showing an operation (S18) at the completion of the security measure communication (FIG. 4) in the computer network system shown in FIG. 1.

FIG. 14 is a communication sequence diagram showing an operation (S18) at the completion of the security measure communication (FIG. 4) in the computer network system 1 shown in FIG. 1.

As shown in FIG. 14, in Steps 180 and 182 (S180 and S182), the security check server 5, which has judged that the client computers 10 are accepted in a security check, notifies the DHCP server 2 and the second GW server 3 of completion of a security measure.

In Steps 190-1 to 190-$n$ (S190-1 to S190-$n$), the client computers 10-1 to 10-$n$ assigned the specific IP addresses according to the processing in S14 sequentially request the DHCP server 2 to reassign IP addresses.

In Steps 192-1 to 192-$n$ (S192-1 to S192-$n$), the DHCP server 2 sequentially assigns general-purpose IP addresses to the client computers 10-1 to 10-$n$.

The client computers 10 reassigned the general-purpose IP addresses resume communication with other arbitrary nodes.

INDUSTRIAL APPLICABILITY

The present invention can be used for assignment of IP addresses, anti-virus measures, and the like in a computer network.

The invention claimed is:

1. A computer system, in which communication is performed using a first IP address with a first netmask having a predetermined number of bits and a second IP address with a second netmask having a number of bits different from that of the first netmask, the computer system comprising:
one or more first nodes for performing communication using the first IP address or the second IP address in a network to which the first netmask and the second netmask are applied;
one or more second nodes for performing communication using the second IP address and performing communication control among the first nodes;
a third node for selectively assigning the first IP address or the second IP address to the first node; and
a fourth node for performing communication with the first nodes, wherein:
the first IP address is an IP address used for communication between each group including one or more of the first nodes, and the fourth node;
the second IP address is an IP address for communication between arbitrary one of the first nodes and the second nodes;
the first nodes communicate with the fourth node using the first IP address assigned thereto; wherein the fourth node is a second gateway server for applying communication control for a security measure to the first nodes; and wherein, in a case where the communication control for the security measure for the first node is performed by the second gateway server, the third node assigns the first IP address with a first netmask having a number of bits smaller than the second netmask to the first nodes
the second nodes communicate with arbitrary one of the first nodes using the second IP address assigned thereto.

2. The computer system according to claim 1, wherein:
the first nodes are network computers;
the second nodes are first gateway servers; and
the third node is a DHCP server.

3. The computer system according to claim 1, further comprising a fifth node for performing communication with the first nodes via the fourth node,
wherein the first nodes further perform communication with the fifth node via the fourth node using the first IP address assigned.

4. The computer system according to claim 3, wherein the fifth node provides the first nodes with a predetermined function via the fourth node.

5. The computer system according to claim 4, wherein:
the first nodes request the third node to assign IP addresses at a predetermined time interval; and
the third node assigns the first IP address or the second IP address to the first nodes for requesting assignment of IP addresses.

6. An IP address assigning apparatus for selectively assigning, in a computer system in which communication is performed using a first IP address with a first netmask having a predetermined number of bits and a second IP address with a second netmask having a number of bits different from that of the first netmask, the first IP address or the second IP address, wherein:
the computer system includes:
one or more first nodes for requesting reassignment of IP addresses at predetermined timing and performing communication using the first IP address or the second IP address assigned in response to this request, in a network to which the first netmask and the second netmask are applied;
one or more second nodes for performing communication using the second IP address and performing communication control among the first nodes; and
a fourth node for performing communication with the first nodes;
the first IP address is an IP address used for communication between each group including one or more of the first nodes, and the fourth node;
the second IP address is an IP address for communication between arbitrary one of the first nodes and the second nodes;
the first nodes communicate with the fourth node using the first IP address assigned thereto;
the second nodes communicate with arbitrary one of the first nodes using the second IP address assigned thereto; and
the IP address assigning apparatus comprises:
assigning means for assigning the second IP address to each of the first nodes; and
reassigning means for, in response to requests for reassignment of IP addresses from the first nodes, to the first nodes which have requested the reassignment of IP addresses, reassigning the first IP address in a case where the fourth node and the first nodes communicate with each other, and reassigning the second IP address in other cases.

7. The IP address assigning apparatus according to claim 6, wherein the reassigning means sequentially reassigns, in response to the request for reassignment of IP addresses from the communication node, the specific IP address to all the communication nodes in a case where the communication between the specific nodes and the communication nodes is performed.

8. A communication method of performing communication in a network using a first IP address with a first netmask having a predetermined number of bits and a second IP address with a second netmask having a number of bits different from that of the first netmask, wherein:
the network includes first to fourth nodes each of which being one or more nodes;
the first IP address is an IP address used for communication between each group including one or more of the first nodes, and the fourth nodes;
the second IP address is an IP address for communication between arbitrary one of the first nodes and the second nodes;
the third nodes selectively assign the first IP address or the second IP address to the first nodes;
each of the first nodes performs communication with the fourth nodes using the first IP address assigned thereto and communicates with the second nodes using the second IP address assigned thereto; wherein the fourth node is a second gateway server for applying communication control for a security measure to the first nodes; and wherein, in a case where the communication control for the security measure for the first node is performed by the second gateway server, the third node assigns the first IP address with a first netmask having a number of bits smaller than the second netmask to the first nodes
each of the second nodes communicates with arbitrary one of the first nodes using the second IP address.

9. An IP address assigning method of selectively assigning, in a computer system in which communication is performed using a first IP address with a first netmask having a predetermined number of bits and a second IP address with a second netmask having a number of bits different from that of the first netmask, the first IP address or the second IP address, wherein:
the computer system includes:
one or more first nodes for requesting reassignment of IP addresses at predetermined timing and performing communication using the first IP address or the second IP address assigned in response to this request, in a network to which the first netmask and the second netmask are applied;

one or more second nodes for performing communication using the second IP address and performing communication control among the first nodes; and a fourth node for performing communication with the first nodes;

the first IP address is an IP address used for communication between each group including one or more of the first nodes, and the fourth node;

the second IP address is an IP address for communication between arbitrary one of the first nodes and the second nodes;

the first nodes communicate with the fourth node using the first IP address assigned thereto;

the second nodes communicate with arbitrary one of the first nodes using the second IP address assigned thereto; and the IP address assigning method comprises:

assigning the second IP address to each of the first nodes; and in response to requests for reassignment of IP addresses from the first nodes, to the first nodes which have requested the reassignment of IP addresses, reassigning the first IP address in a case where the fourth node and the first nodes communicate with each other, and reassigning the second IP address in other cases.

10. A program stored on a memory and executed by a processor for performing communication in a network using a first IP address with a first netmask having a predetermined number of bits and a second IP address with a second netmask having a number of bits different from that of the first netmask, wherein:

the network includes first to fourth nodes each of which being one or more nodes;

the first IP address is an IP address used for communication between each group including one or more of the first nodes, and the fourth nodes;

the second IP address is an IP address for communication between arbitrary one of the first nodes and the second nodes; and the program causes a computer to execute the steps of:

selectively assigning, by the third nodes, the first IP address or the second IP address to the first nodes;

performing, by each of the first nodes, communication with the fourth nodes using the first IP address assigned thereto and communication with the second nodes using the second IP address assigned thereto; and performing, by each of the second nodes, communication with arbitrary one of the first nodes using the second IP address wherein the fourth node is a second gateway server for applying communication control for a security measure to the first nodes; and wherein, in a case where the communication control for the security measure for the first node is performed by the second gateway server, the third node assigns the first IP address with a first netmask having a number of bits smaller than the second netmask to the first nodes.

11. A program stored on a memory and executed by a processor for an IP address assigning method of selectively assigning, in a computer system in which communication is performed using a first IP address with a first netmask having a predetermined number of bits and a second IP address with a second netmask having a number of bits different from that of the first netmask, the first IP address or the second IP address, wherein:

the computer system includes:

one or more first nodes for requesting reassignment of IP addresses at predetermined timing and performing communication using the first IP address or the second IP address assigned in response to this request, in a network to which the first netmask and the second netmask are applied;

one or more second nodes for performing communication using the second IP address and performing communication control among the first nodes; and a fourth node for performing communication with the first nodes;

the first IP address is an IP address used for communication between each group including one or more of the first nodes, and the fourth node;

the second IP address is an IP address for communication between arbitrary one of the first nodes and the second nodes;

the first nodes communicate with the fourth node using the first IP address assigned thereto;

the second nodes communicate with arbitrary one of the first nodes using the second IP address assigned thereto; and the program causes a computer to execute the steps of:

assigning the second IP address to each of the first nodes; and in response to requests for reassignment of IP addresses from the first nodes, to the first nodes which have requested the reassignment of IP addresses, reassigning the first IP address in a case where the fourth node and the first nodes communicate with each other, and reassigning the second IP address in other cases.

* * * * *